J. & A. RAAB.
SHOCK ABSORBER.
APPLICATION FILED SEPT. 10, 1913.
1,109,546.
Patented Sept. 1, 1914.
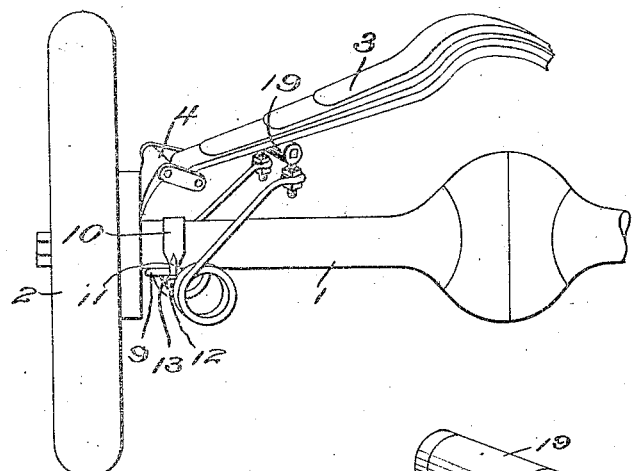
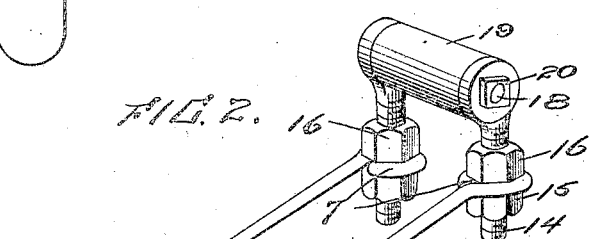
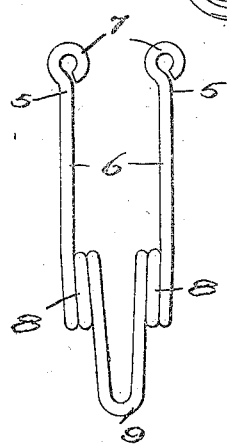
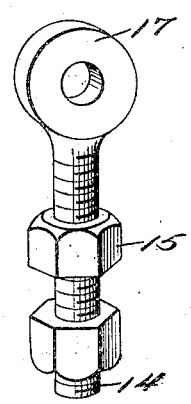
Witnesses
R. S. Trogner
W. H. Wakefield
John Raab
and
Andrew Raab, Inventors
By Mason, Fenwick & Lawrence
Attorneys

UNITED STATES PATENT OFFICE.

JOHN RAAB AND ANDREW RAAB, OF TACOMA, WASHINGTON.

SHOCK-ABSORBER.

1,109,546.

Specification of Letters Patent.

Patented Sept. 1, 1914.

Application filed September 10, 1913. Serial No. 789,173.

*To all whom it may concern:*

Be it known that we, JOHN RAAB and ANDREW RAAB, citizens of the United States, residing at Tacoma, in the county of Pierce and State of Washington, have invented certain new and useful Improvements in Shock-Absorbers; and we do hereby declare the following to be a full, clear, and exact description of the invention, such as will enable others skilled in the art to which it appertains to make and use the same.

This invention relates to improvements in shock absorbers for automobiles, and an object of the invention is to provide a shock absorber having a rolling contact with the leaf spring of an ordinary vehicle and secured to the axle of the vehicle in such a way as to be guided by said axle as the absorber assumes different positions.

A further object of the invention is to provide an absorber secured at one end of an axle and having a free end extending toward the center of the axle carrying anti-friction means for engaging the spring of the vehicle.

A further object of the invention is to provide an absorber the resilient portion of which is located upon one side of an axle, while the portion engaging the ordinary spring extends upon the other side of the axle, the whole construction being simple and held in place by the axle.

With these and other objects in view, the invention consists in certain constructions, combinations and arrangements which will be hereinafter fully described and claimed.

In the drawings where similar reference characters designate corresponding parts, Figure 1 shows one end of an axle having the ordinary wheel and leaf elliptical spring with the absorber applied thereto; Fig. 2 is an enlarged perspective view of the absorbing device shown in Fig. 1; Fig. 3 is a top plan view of the spring forming part of the absorber; and Fig. 4 is a detail view showing one means of adjusting the spring.

The general aim of the invention is to provide a pair of springs with loops located below the axle of the vehicle to which the absorber is applied, the end of the springs adjacent the loops being secured to the under side of the axle by any suitable means, while the ends remote from the loops extend one to each side of the axle, and are adjustably connected to a common roller which frictionally engages a leaf or elliptical spring such as is commonly used in vehicle constructions.

Referring to the drawings, 1 designates one end of an axle having the ordinary wheel 2, and having an elliptical leaf spring 3, which is secured as at 4, to the axle in any approved manner forming no part of the present invention. The resilient member forming the absorber comprises a spring 5 formed of steel wire or other suitable material having parallel sides 6 which terminate at one end in eyes 7 while the other ends are bent to form loops 8, from which the central portion 9 of the spring extends, the construction being substantially as shown in Figs. 2 and 3 of the drawing.

In order that the spring may be secured to the axle, there is provided a strap 10 having depending therefrom on each side, a screw 11, although one screw only, is shown in the drawing. These screws 11 receive nuts 12 which bind a plate 13 against the central portion 9 of the absorber spring, so that the said end 9 is held securely against the under side of the axle. By mounting the plate 13 a short distance from the end of the central portion 9, the two sides of the loop 9 will receive the rounded portion of the axle and will therefore be held against rotating movement about the screws.

The eyes 7 are designed to receive screws 14 upon which are mounted nuts 15 and 16 respectively, these nuts 15 and 16 adapted to lie one upon each side of the eyes 7. The upper end of the screw nut 14 is provided with a shank 17 which receives a trunnion 18 mounted upon each end of a roller 19. The outer ends of these trunnions may be threaded to receive a nut 20 for the purpose of securing the roller 19 to the parallel sides 6 of the spring 5.

By referring to Fig. 1, it will be seen that the roller 19 is disposed beneath the leaf spring 3, and that as the said spring 3 moves under the action of the car in motion, the roller will move back and forth on the under side thereof, and it will be noted that the greater the depression of the spring 3, the greater the distortion of the absorber will be, inasmuch as any downward movement of the roller 19 is accompanied by an increasing resistance offered by the loop 8 of the spring 5. It will further be noted that as the axle passes between the parallel sides 6 and as the central portion 9 is secured beneath the axle, this particular form of mounting will guide the roller 19 against the spring 3. Of course it will be within the scope of the present invention to vary the number of loops 8, and we may also vary the method of connecting the eyes 7 to the roller 19. It is desirable to have the eyes 7 adjustable with respect to the roller 19 as is made possible by the construction shown in Fig. 2, although this is not considered altogether necessary.

What I claim is:

1. A shock absorber for vehicles comprising a resilient member, one end of which is secured to the lower side of the axle of the vehicle, parallel portions being formed on the resilient member one extending upon each side of the axle, and an anti-friction member mounted between said parallel members adapted to engage an elliptical spring carried by the vehicle.

2. A shock absorber for vehicles comprising a resilient member, the lower end of which is secured to the axle adjacent one end thereof, there being substantially parallel portions on the resilient member extending one upon each side of the axle, and an anti-friction member mounted between said substantially parallel portions adapted to engage an elliptical spring carried by the vehicle, said parallel portions extending toward the center of the axle.

3. A shock absorber for vehicles comprising a resilient member, the central portion of which is bent to present substantially parallel portions adapted to engage the under side of the axle, means for holding substantially parallel portions against the axle, and means carried by the resilient member for engaging the elliptical spring of the vehicle.

4. A shock absorber for vehicles comprising a bent spring member having two looped ends, adjustable roller carrying means passing through said looped ends, and a roller carried by said carrying means adapted to engage the leaf spring of the vehicle.

5. A shock absorber for vehicles comprising a bent spring member secured to the axle of the vehicle, and having two ends extending therefrom, one of said ends extending upon each side of the axle, and means for spacing the ends of said ends, said spacing member comprising anti-friction means adapted to engage the leaf spring of a vehicle.

6. A shock absorber for vehicles comprising a bent spring member, the central portion of which has substantially parallel sides adapted to engage the axle of the vehicle, a strap surrounding said axle having depending ends lying upon each side of the axle, means engaging said depending ends adapted to lock the central portion of the resilient member to the axle, and anti-friction means carried by the ends of the axle member adapted to engage the leaf spring of the vehicle.

7. A shock absorber for vehicles comprising a bent spring member the central portions of which comprise substantially parallel sections of the resilient member, means for securing said central section to the axle of the vehicle, means preventing spreading of said substantially parallel sections, and an anti-friction member carried by the free ends of said resilient member adapted to engage the leaf spring of the vehicle.

8. A shock absorber for vehicles secured to the axle of a car, and having two extending ends provided with eyes, threaded rods extending through and adjustably connected to said eyed ends, one end of each of said threaded rods being provided with an opening, a roller located between said ends of the rods and having journals extending through the openings of the threaded rods, and means for holding the journals within the openings of the rods.

In testimony whereof we affix our signatures in presence of two witnesses.

JOHN RAAB.
ANDREW RAAB.

Witnesses:
EMIL N. STENBERG,
VERA SUNDBERG.